July 8, 1941.   J. JIN SOW   2,248,591
CALENDAR
Filed April 22, 1939
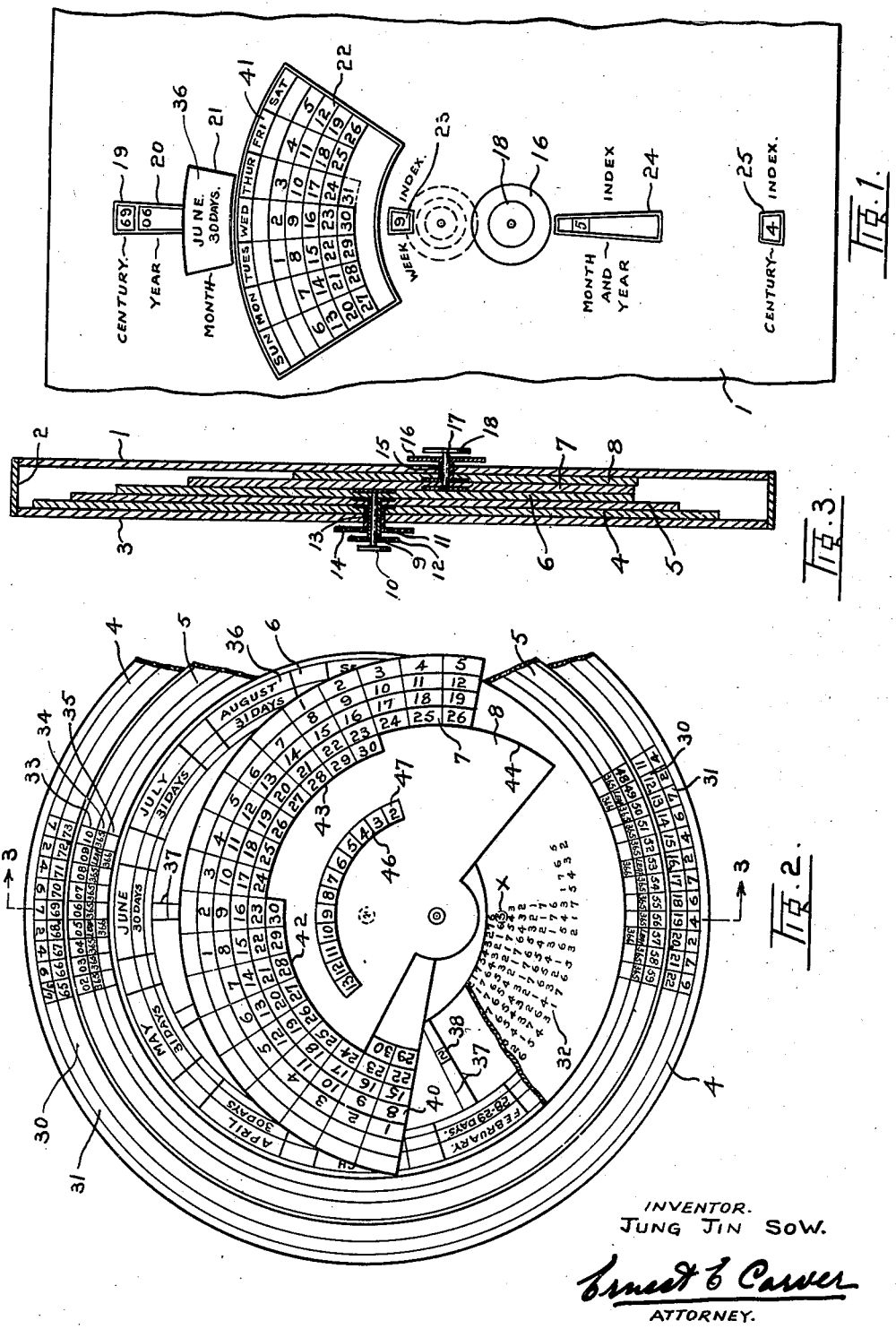
INVENTOR.
JUNG JIN SOW.
Ernest E Carver
ATTORNEY.

Patented July 8, 1941

2,248,591

UNITED STATES PATENT OFFICE 2,248,591

CALENDAR

Jung Jin Sow, Vancouver, British Columbia, Canada

Application April 22, 1939, Serial No. 269,363

1 Claim. (Cl. 40—113)

My invention relates to improvements in calendars of the so-called perpetual type. The objects of the invention are to provide a calendar in which any month of any year within the scope of the calendar may be displayed; to provide a calendar covering the period from 1 B. C. to 9999 A. D. in a small compass, say five or six inches square, where every character may be read without artificial aid by a person of normal eyesight; to provide a calendar which will give accurate information according to the Julian which was in force up to October 5, 1582, and the Gregorian calendar which has been in force ever since, also to provide a calendar which will accurately indicate all leap years and all common years during that time accounting for such century years as 1700, 1800 and 1900 which were regarded as common years.

The invention consists of a front panel having a vertical row of viewing openings and a plurality of charts rotatably mounted behind said panel, which are provided with characters indicative of centuries, years, months and days, and indexes which added together indicate the position to which one of the charts must be moved to show the day of the month sought, as will be more fully described in the following specification and shown in the accompanying drawing, in which:

Figure 1 is a part elevational view of the invention.

Figure 2 is a front view of the several charts disposed behind the front panel.

Figure 3 is a sectional view taken on the line 3—3 of Figure 2.

In the drawing like characters of reference indicate corresponding parts in each figure.

The numeral 1 indicates generally a front panel, see Figures 1 and 3, suitably bound by a rim 2 which also supports a rear panel 3. Rotatably mounted on an axis extending through the rear panel 3 are charts 4, 5 and 6, and mounted on an axis extending through the front panel 1 are charts 7 and 8. The chart 6 is provided with a pivot pin 9 and a knob 10. A sleeve 11 is journaled upon the pivot pin 9 and is fitted at one end with a knob 12 and supports the chart 5 at its inner end. The chart 4 is secured to a sleeve 13 which is journalled within the rear panel 3 and upon the sleeve 11 and this sleeve is fitted with a knob 14. The chart 8 is fitted with a sleeve 15 extending through the front panel 1 and is fitted with a knob 16 and concentrically mounted in the sleeve 15 is a pivot pin 17 to which the chart 7 is secured and which also is provided with a turning knob 18.

The front panel 1 is provided with a plurality of viewing openings which are vertically aligned along the centre of the panel and are respectively numbered 19, 20, 21, 22, 23, 24 and 25 and are adapted to expose to view, in the above order, a Century number, such as 69 for the century 6900, Year number such as 06, the month and the number of days therein, such as "June 30 days," the days of the month 1 to 30, the week index, the Month and Year index and the Century index.

The chart 4 is provided with circular rows of figures 30 and 31, the figures 30 representing century numbers from which are selectively displayed in the opening 19. These numbers are displayed in two colours, such as red and black, but for the purpose of identification in the drawing, the red numbers are followed by a dot. Those numbers which are shown with a dot represent the centuries of the Julian calendar and the centuries in which every fourth year is a leap year.

In the centre portion of chart 5 are 9 rows of concentrically arranged index numbers 32 any one of which may be brought into display in the Month and Year opening 24 of the front panel 1. At the periphery of chart 5 are three concentric rows indicated respectively by 33, 34 and 35. In the row 33 year numbers 0 to 99 are displayed, every fourth year being shown with a dot to represent leap year. Radially inward beneath each year number in row 34 is the number of days in the year represented or the word "leap" and in row 35 registering with the word "leap" is the number 366 representing the days of that year.

Chart 6 is provided with segments 36 each of which bear the name of a month and the number of days in the month, such as June 30 days and any of the segments may be brought into register with the Month opening 21 of the front panel 1. Disposed radially of the chart 6 are pairs of spaced lines 37 between each of which a small opening 38 is formed. The several openings 38 are variously spaced from the centre of the chart and are each of such size as to expose one number only of one of the rows 32 on chart 5.

Charts 7 and 8 are both mounted eccentrically to the charts 4, 5 and 6 and both are segmental, consequently the indicia carried by the chart 7 can be of substantial size for convenient display. The chart 7 is provided with seven concentric rows of numbers 40, which numbers range from 1 to 31 and are repeated in a predetermined order three times. A segment of the rows 40 consists generally of seven numbers to a row to be displayed in the opening 22.

Bordering the upper margin of the week day opening 22 of the front panel 1 is a line of words 41 representing the days of the week, which read with the proper numbers displayed in the opening 22 showing the day of any month date desired.

The chart 8 is substantially semi-circular and is stepped at its periphery to three different radii as at 42, 43 and 44, each of these steps being adapted to cover a portion of one of the lower rows 40 of numbers upon the chart 7 and to leave exposed in the opening 22 only the 28, 29, 30 or 31 days of the month sought, as indicated in the month opening 21. An arcuate slot 46 is formed in the chart 8 which overlies a portion of a row of index numbers 47 which are displayed upon the chart 7, and which are so spaced from the axis of the chart that any one of them may be brought into register with the Week index opening 23.

To find the days of say the month of June of the year 6906, the chart 4 is turned to expose the century number 69 in the Century opening 19, which automatically exposes in the Century index opening 25 the century index 4. Next chart 5 is turned to expose 06 and 365 in the year opening 20, the figures thus far found are in black or not affixed by a dot, consequently they refer to a common year as indicated by the number of days, viz, 365. The above disposition of the year 06 brings into line with the Month and Year opening the numerals 6, 5, 4, 3, 2, 1, 7, 4 and 1, reading down. The chart 6 is then turned to expose June 30 days in the Month opening 21, which brings one pair of lines 37 within the Month and Year index opening 24. The opening 38 between this pair of lines is spaced one row down from the centre of the chart 6 and consequently exposes the number 5, indicated on Figure 2 by a dotted circle X. We now have exposed in the openings 25 and 24 two indexes 4 and 5 the sum of which is 9, hence we turn the chart 7 until the index number 9 of the row 47 until said index 9 is displayed in the Week Day opening 22, then, since June is shown as having 30 days only, we turn the chart 8 until the second step 43 of said chart obscures the number 31. This completes the operation and shows the month to begin on Tuesday and end on Wednesday.

If the setting of the month of January in a year indicated as a leap year and the month year index exposed in opening 24 can be either 4 or 3, then the index 3 must be added to the century index instead of the number 4, since the latter refers to a common year.

What I claim as my invention is:

A calendar comprising a front panel having aligned viewing openings, a plurality of superimposed charts rotatably mounted behind said panel, three of said charts being rotatable about one axis and two of said charts being rotatable about a second axis, said second axis being between the first named axis and the periphery of the first mentioned three charts, two of the first mentioned three charts having characters indicative of time periods and indexes relative to said characters, one of said first mentioned charts having openings capable of selective registration with a viewing opening of the panel adapted when so registered to display an index of another of the first mentioned three charts, the second mentioned two charts consisting of a chart having rows of consecutive numbers representing the days of the month and an index relative thereto representing a week index and a chart having peripheral steps adapted to selectively obscure a portion of some of the rows of consecutive numbers, said last mentioned chart having an arcuate slot in register with one of the viewing openings of the front panel for selectively exposing a week index number in said panel viewing opening.

JUNG JIN SOW.